No. 689,450. Patented Dec. 24, 1901.
H. S. AMWAKE.
VOLTAIC CELL.
(Application filed Feb. 9, 1901.)
(No Model.)
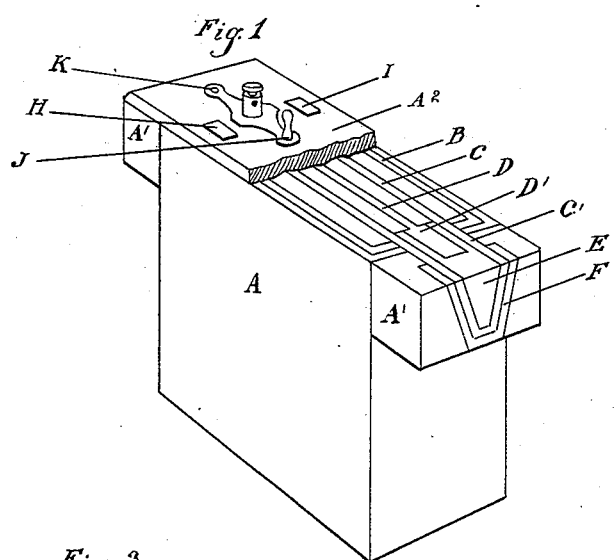
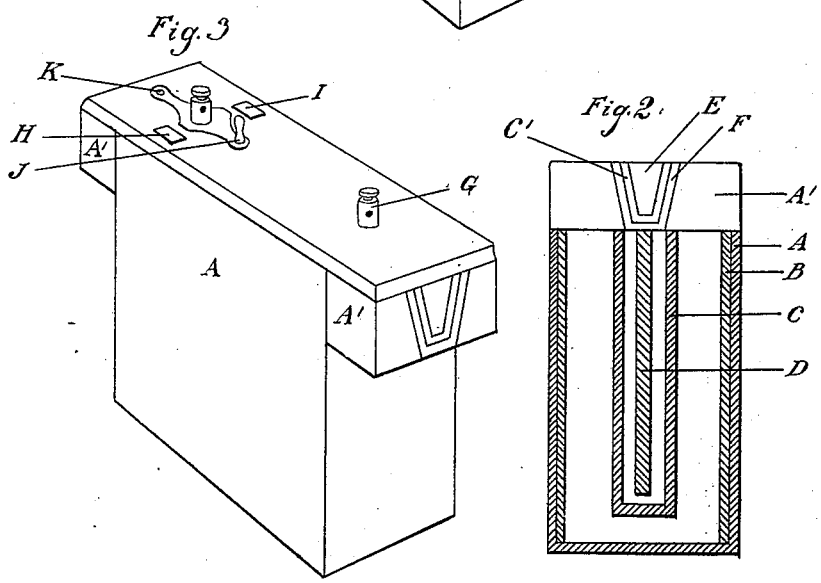
INVENTOR
Harry S Amwake

UNITED STATES PATENT OFFICE.

HARRY SKILES AMWAKE, OF CAMDEN, NEW JERSEY.

VOLTAIC CELL.

SPECIFICATION forming part of Letters Patent No. 689,450, dated December 24, 1901.

Application filed February 9, 1901. Serial No. 46,731. (No model.)

*To all whom it may concern:*

Be it known that I, HARRY SKILES AMWAKE, a citizen of the United States of America, and a resident of Camden, in the county of Camden, State of New Jersey, have invented certain new and useful Improvements in Voltaic Cells, of which the following is a specification.

The object of my invention is an improvement in the cells of primary electric batteries whereby the flow of the current may for a short period be greatly increased above the normal energy of the cell. Motor-vehicles using electricity require in emergency an extra power for a short time, and my construction of cell is to provide that reserve of power in a light and compact manner.

Referring to the accompanying drawings, Figure 1 represents a perspective view of one of my improved cells; Fig. 2, an end view in section of the same; and Fig. 3, a view of a cell with its cover on, showing terminal connections.

Describing the same in detail, A is a case, made, preferably, of wood, fiber, vulcanite, or the like. A' represents housings at the ends of the same to furnish support to the carbon and other like contents of the cell.

B is a lining of sheet-carbon which lies close to the ends and sides of the case. Said carbon is joined together at its edges to make good electrical connection throughout itself.

C is a porous carbon-box closed on all sides except the top. Being porous, the electric forces are able to pass through it when called into action in the operation of the cell. Its projecting ends C' rest upon the housings A'. Between same are insulators F. Both B and C are electrodes, and current may be drawn from either one desired, as explained in the following:

D is a plate of zinc, and D' the arms by which it rests in its place upon the housings A'. It is separated from the carbon electrode C by the insulator E.

G is the terminal for the zinc element, which is carried through the cover A². H is the terminal for the carbon electrode B, also carried through the cover A², and I is the terminal for the carbon electrode C.

J is a switch pivoted at K and free to be moved into contact with either terminal H or I, as desired.

The form of my cell is preferably rectangular, and width is my least dimension. In fact I aim at narrowness in order that the sides of the elements may be brought as closely together as practical to reduce internal resistance to a minimum and at the same time maintain capacity for amperage.

I use the same solution or electrolyte in each of the compartments formed by the carbon vessel C and its position in the arrangement of parts. It is preferably composed of bichromate of sodium, sulfuric acid, and water, and the proportions of the same may be those usually employed in the compounding of said electrolyte.

In operation when I desire what I consider is the normal flow of current I move my switch J into contact with the terminal H and place same in metallic circuit connection with the zinc terminal G. The action is then that of a double-fluid cell, for the zinc is attacked by the solution in the porous carbon vessel C, while an oxidizing or depolarizing action takes place outside it. This is the normal way of operating the cell, and it gives the most economic results. For the emergency flow I change my connections from the terminal H to the terminal I, thereby placing the zinc in direct action with the porous carbon vessel C. The cell now operates as a single-fluid one, and as the resistance is reduced to a minimum between the zinc and the inner carbon electrode, because of their being placed as near to each other as possible, current is rapidly generated, and in consequence the energy of the cell is greatly increased and a much larger flow of current is made temporarily available. Besides, I do away with the necessity of carrying excessive weight of cell and solution necessary to develop a larger power.

I am aware that a plurality of carbon elements in a cell is old and that to carry a switch on the cover to connect terminals is old also. I therefore do not broadly claim any such arrangement; but

What I claim as new, and desire to secure by Letters Patent, is—

1. In a double-fluid voltaic cell, two containing vessels of carbon, each acting as an electrode, one lying within, insulated and separated from the other, an electrolyte filling the space between, the inner vessel containing an electrolyte and an insulated zinc electrode, and means by which either one of said carbon electrodes may be separately connected in metallic circuit with said zinc electrode, substantially as described.

2. In a voltaic cell, two carbon electrodes, one of same lying within and separated from the other, and between them an electrolyte, the inner one being a porous carbon-cup containing a zinc electrode and an electrolyte, each provided with separate terminals, and means for making electrical contact with and putting either of said terminals in circuit connection with the terminal of said zinc electrode, substantially as illustrated and described.

Signed at Philadelphia, Pennsylvania, this 19th day of January, 1901.

HARRY SKILES AMWAKE.

Witnesses:
 JOS. H. WILSON,
 JAS. U. ROBERTSON.